US010752119B2

(12) United States Patent
Chen et al.

(10) Patent No.: US 10,752,119 B2
(45) Date of Patent: Aug. 25, 2020

(54) INTELLIGENT POWER DISTRIBUTING SYSTEM FOR CHARGING STATION (71) Applicant: PHIHONG TECHNOLOGY CO., LTD., Taoyuan (TW)

(72) Inventors: Chun-Chen Chen, Taoyuan (TW); Jian-Hsieng Lee, Tainan (TW); YingChieh Yeh, Tainan (TW); Hsiao-Tung Ku, Taoyuan (TW)

(73) Assignee: PHIHONG TECHNOLOGY CO., LTD, Taoyuan (TW)

( * ) Notice: Subject to any disclaimer, the term of this patent is extended or adjusted under 35 U.S.C. 154(b) by 296 days.

(21) Appl. No.: 15/452,351

(22) Filed: Mar. 7, 2017

(65) Prior Publication Data

US 2018/0178662 A1 Jun. 28, 2018

(30) Foreign Application Priority Data

Dec. 27, 2016 (TW) .................. 105143433

(51) Int. Cl.
*B60L 11/18* (2006.01)
*H02J 7/00* (2006.01)
(Continued)

(52) U.S. Cl.
CPC ........... *B60L 11/1816* (2013.01); *B60L 53/00* (2019.02); *B60L 53/14* (2019.02); *B60L 53/22* (2019.02); *B60L 53/30* (2019.02); *B60L 53/60* (2019.02); *B60L 53/63* (2019.02); *H02J 7/0027* (2013.01); *B60Y 2200/91* (2013.01);
(Continued)

(58) Field of Classification Search
CPC .............. B60L 11/1816; B60L 11/1824; B60L 11/1838; B60L 11/1809; B60L 11/1844; B60L 11/1812; B60L 11/18; B60Y 2300/91; B60Y 2200/91; H02J 7/0027; H02J 7/0068; H02J 7/0024; Y02E 60/721; Y02T 10/7005; Y02T 10/7072;
(Continued)

(56) References Cited

U.S. PATENT DOCUMENTS 5,343,140 A * 8/1994 Gegner .................. G05F 1/618
                                                          323/222
5,636,106 A * 6/1997 Batarseh ............. H02M 1/4208
                                                          323/222

(Continued)

*Primary Examiner* — Richard Isla
*Assistant Examiner* — Dung V Bui
(74) *Attorney, Agent, or Firm* — Muncy, Geissler, Olds & Lowe, P.C.

(57) ABSTRACT

An intelligent power distributing system for charging station includes at least one charging module; an intelligent switching unit coupled to the at least one charging module; at least two charging guns coupled to the intelligent switching unit; and at least two system controlling and monitoring units coupled to the at least two charging guns respectively, each of the at least two system controlling and monitoring units being coupled to the at least one charging module, one of the at least two system controlling and monitoring units transmitting instructions to the intelligent switching unit according to the power outputting states of the at least two charging guns, such that the intelligent switching unit dynamically distributes the charging power of the at least one charging module to one or more of the at least two charging guns.

14 Claims, 5 Drawing Sheets (51) Int. Cl.
  *B60L 53/60* (2019.01)
  *B60L 53/22* (2019.01)
  *B60L 53/00* (2019.01)
  *B60L 53/63* (2019.01)
  *B60L 53/30* (2019.01)
  *B60L 53/14* (2019.01)

(52) U.S. Cl.
  CPC ......... *B60Y 2300/91* (2013.01); *Y02E 60/721* (2013.01); *Y02T 10/7005* (2013.01); *Y02T 10/7072* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(58) Field of Classification Search
  CPC ..... Y02T 90/163; Y02T 90/121; Y02T 90/14; Y02T 90/127; Y02T 90/128; Y04S 10/126
  USPC .......................................................... 320/109
  See application file for complete search history.

(56) References Cited

U.S. PATENT DOCUMENTS

| | | | |
|---|---|---|---|
| 5,932,934 A * | 8/1999 | Hofstetter | H02M 3/158 307/26 |
| 6,462,962 B1 * | 10/2002 | Cuk | H02M 1/34 363/131 |
| 2006/0013021 A1 * | 1/2006 | Aso | H02M 1/34 363/21.09 |
| 2007/0164718 A1 * | 7/2007 | Nishi | H02M 3/158 323/284 |
| 2011/0096577 A1 * | 4/2011 | Yamada | H02M 7/217 363/44 |
| 2011/0116294 A1 * | 5/2011 | Wolf | H02M 3/335 363/132 |
| 2011/0134675 A1 * | 6/2011 | Grbovic | H02M 7/1623 363/127 |
| 2011/0279082 A1 * | 11/2011 | Hagenmaier, Jr. | B60L 53/18 320/109 |
| 2012/0032505 A1 * | 2/2012 | Kusumi | B60L 58/22 307/10.1 |
| 2012/0140752 A1 * | 6/2012 | Yun | B60L 53/65 370/338 |
| 2012/0326504 A1 * | 12/2012 | Ballantine | H02J 3/006 307/24 |
| 2013/0314038 A1 * | 11/2013 | Kardolus | B60L 53/20 320/109 |
| 2014/0111185 A1 * | 4/2014 | Cordero-Orille | H02J 7/022 324/76.77 |
| 2014/0160280 A1 * | 6/2014 | Rodriguez | H04N 7/188 348/143 |
| 2015/0180330 A1 * | 6/2015 | Ye | H02M 1/4225 363/126 |
| 2016/0193932 A1 * | 7/2016 | Vaghefinazari | H02J 7/0021 320/109 |
| 2016/0280082 A1 * | 9/2016 | Tajima | H02J 7/0029 |
| 2017/0282747 A1 * | 10/2017 | Wang | B60L 53/14 |

* cited by examiner

|  | 1 | 2 | 3 | 4 | 5 |
|---|---|---|---|---|---|
| First charging gun | 80kW | 60kW | 40kW | 20kW | 0KW |
| Second charging gun | 0kW | 20kW | 40k | 60k | 80k |

INTELLIGENT POWER DISTRIBUTING SYSTEM FOR CHARGING STATION

FIELD OF THE INVENTION

The present invention relates to power distribution, and particularly to an intelligent power distributing system for a charging station.

BACKGROUND OF THE INVENTION

In the traditional dual charging gun system for electric car charging, the maximum output energy or output power of the dual charging guns is half of the output energy or output power of the entire system. When the dual charging guns are outputting electric power, if the battery connected with the output of one of the dual guns is almost fully charged, the system will not provide the redundant energy to another gun but continues outputting electric power or stops outputting electric power while another gun still performs charging with only half of the output energy or output power of the entire system, such that half of the output energy or output power is idle and cannot be employed efficiently.

Accordingly, there is still a need for a technical solution which can solve the problem of frequent idleness of the redundant output energy or output power of the traditional dual charging gun system.

SUMMARY OF THE INVENTION

To overcome the problem of frequent idleness of the redundant output energy or output power of the traditional dual charging gun system, the present invention provides an intelligent power distributing system for a charging station.

In one aspect, the present invention discloses an intelligent power distributing system for charging station, including: at least one charging module; an intelligent switching unit coupled to the at least one charging module; at least two charging guns coupled to the intelligent switching unit; and at least two system controlling and monitoring units coupled to the at least two charging guns respectively, each of the at least two system controlling and monitoring units being coupled to the at least one charging module, one of the at least two system controlling and monitoring units transmitting instructions to the intelligent switching unit according to power outputting states of the at least two charging guns, such that the intelligent switching unit dynamically distributes charging power of the at least one charging module to one or more of the at least two charging guns.

One advantage of the present invention is that the present invention can distribute the charging energy or the charging power efficiently and optimize the distribution of the charging energy or the charging power.

Another advantage of the present invention is that the present invention can reduce the time required to charge the electric car or the electric motorcycle to the minimum.

These and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below.

DETAILED DESCRIPTION OF THE PREFERRED EMBODIMENT

The present invention will now be described with the preferred embodiments and aspects and these descriptions interpret structure and procedures of the present invention only for illustrating but not for limiting the Claims of the present invention. Therefore, except the preferred embodiments in the specification, the present invention may also be widely used in other embodiments.

The present invention provides an intelligent power distributing system for a charging station. The intelligent power distributing system for the charging station of the present invention can distribute charging energy or charging power in a multiple gun charging system efficiently to achieve the function or effect of optimizing the distribution of the charging energy or the charging power.

Figure 1:
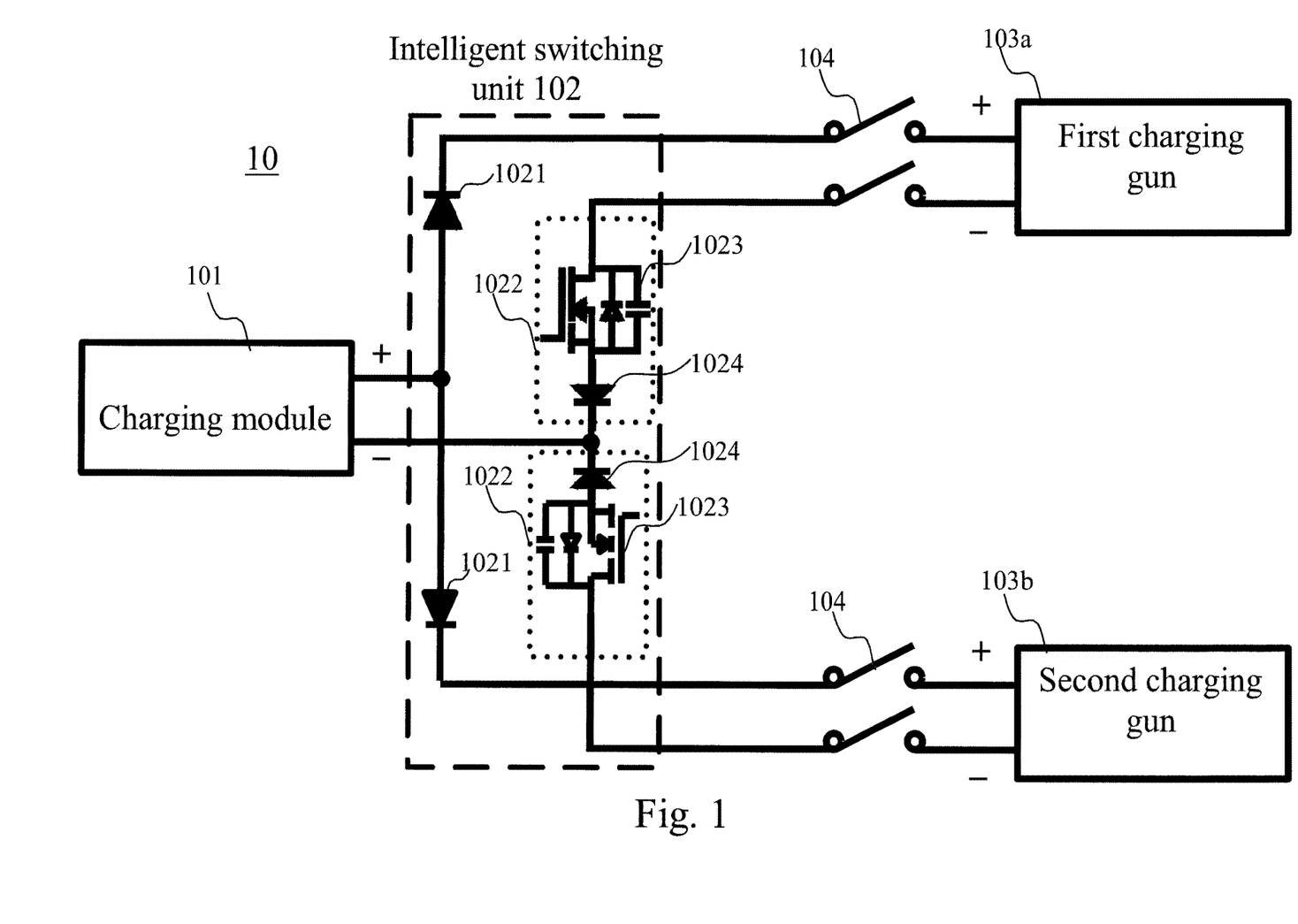
FIG. 1 illustrates an intelligent power distributing system for a charging station of the present invention in accordance with one embodiment of the present invention.
Figure 5:
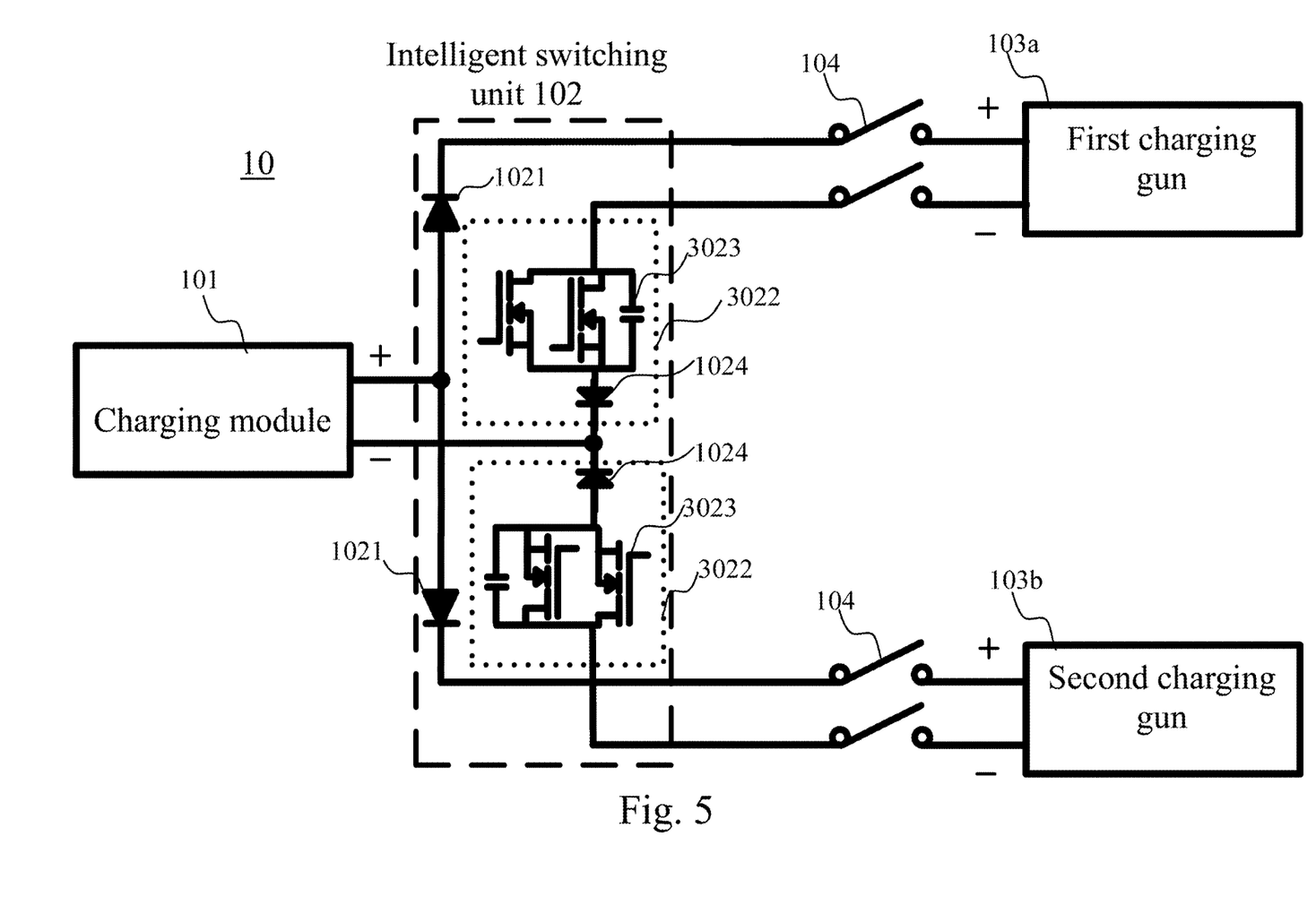
FIG. 5 illustrates an intelligent power distributing system for a charging station of the present invention in accordance with another embodiment of the present invention.

Please refer to FIG. 1. In one embodiment of the present invention, the intelligent power distributing system for the charging station 10 of the present invention may include a charging module 101, an intelligent switching unit 102 and a plurality of charging guns, for example a first charging gun 103a and a second charging gun 103b. The charging module 101 is coupled to the intelligent switching unit 102 while the intelligent switching unit 102 is coupled to the plurality of charging guns, for instance the first charging gun 103a and the second charging gun 103b respectively. The first charging gun 103a and the second charging gun 103b are utilized to charge an electric car or an electric motorcycle. The intelligent switching unit 102 is employed to dynamically distribute the charging power of the charging module 101 to the first charging gun 103a and/or the second charging gun 103b. In one embodiment, at least two switches 104 are disposed between the first charging gun 103a and the intelligent switching unit 102 and between the second charging gun 103b and the intelligent switching unit 102 respectively. In a preferred embodiment, the intelligent switching unit 102 may include at least two MOSFETs (Metal-Oxide-Semiconductor Field-Effect Transistor), for instance but be not limited to at least two enhanced N type MOSFETs (such as two enhanced N type MOSFETs), at least two diodes, for example two diodes, and at least two capacitors, such as two capacitors. The at least two enhanced N type MOSFETs, the at least two diodes and the at least two capacitors are coupled to each other in parallel to form element 1023. The element 1023 may be coupled to a diode 1024 in series to form element 1022. In one embodiment, the intelligent switching unit 102 may further include at least two diodes 1021, for instance two diodes. These two diodes 1021 are independent of the at least two enhanced N type MOSFETs, the at least two diodes and the at least two capacitors. It should be noted that the aforementioned numbers are only described for illustrating the present invention, not for limiting the scope of the present invention. Any applicable numbers may be applied in the present invention. In one alternative embodiment, the element 1022 may be replaced with a relay. In one alternative embodiment, the MOSFET in the element 1023 may be replaced with an IGBT (Insulated Gate Bipolar Transistor). In one alternative embodiment, all of the diodes for example the diodes 1021 and 1024 or the diode in the element 1023 may be replaced with MOSFET or IGBT for example as shown in FIG. 5. In one alternative embodiment, the diodes 1021 may be replaced with the element 1022.

Figure 2:
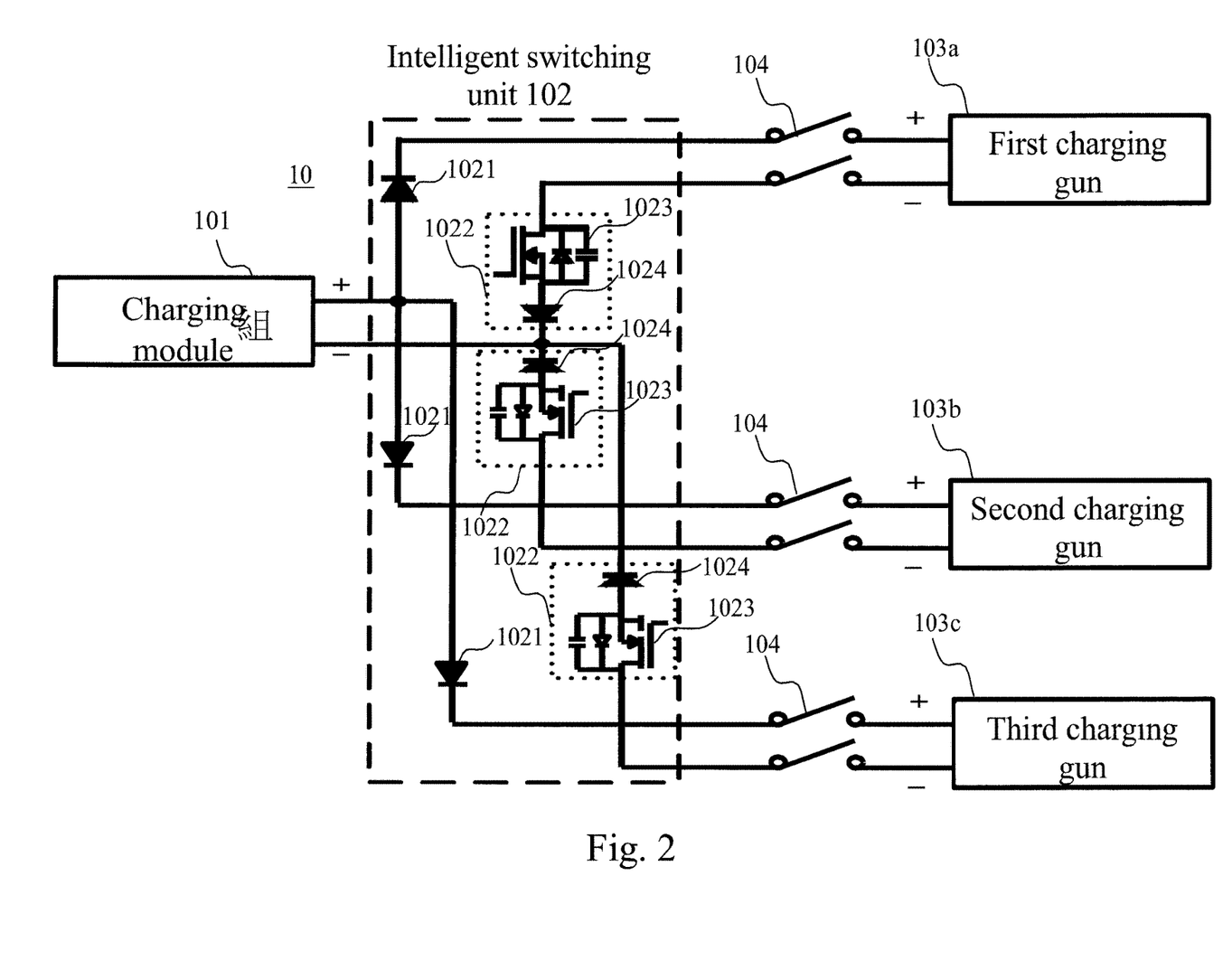
FIG. 2 illustrates an intelligent power distributing system for a charging station of the present invention in accordance with another embodiment of the present invention.

Please refer to FIG. 2. In another embodiment of the present invention, the intelligent power distributing system for the charging station 10 of the present invention may include a plurality of charging guns, for example three charging guns such as a first charging gun 103*a*, a second charging gun 103*b* and a third charging gun 103*c* shown in FIG. 2. In this embodiment, corresponding three charging guns, the intelligent switching unit 102 may include three MOSFETs, for example but be not limited to three enhanced N type MOSFETs, three diodes and three capacitors correspondingly. In one embodiment, the intelligent switching unit 102 may further include three diodes 1021, which are independent of the three enhanced N type MOSFETs, the three diodes and the three capacitors. It should be noted that the aforementioned numbers are only described for illustrating the present invention, not for limiting the scope of the present invention. Any applicable numbers may be applied in the present invention. It should be noted that the repeated descriptions are omitted because the difference between this embodiment and the first embodiment is only the quantitative difference. In one alternative embodiment, the element 1022 may be replaced with a relay. In one alternative embodiment, the MOSFET in the element 1023 may be replaced with an IGBT. In one alternative embodiment, all of the diodes for example the diodes 1021 and 1024 or the diode in the element 1023 may be replaced with MOSFET or IGBT. In one alternative embodiment, the diodes 1021 may be replaced with the element 1022.

Figure 3:
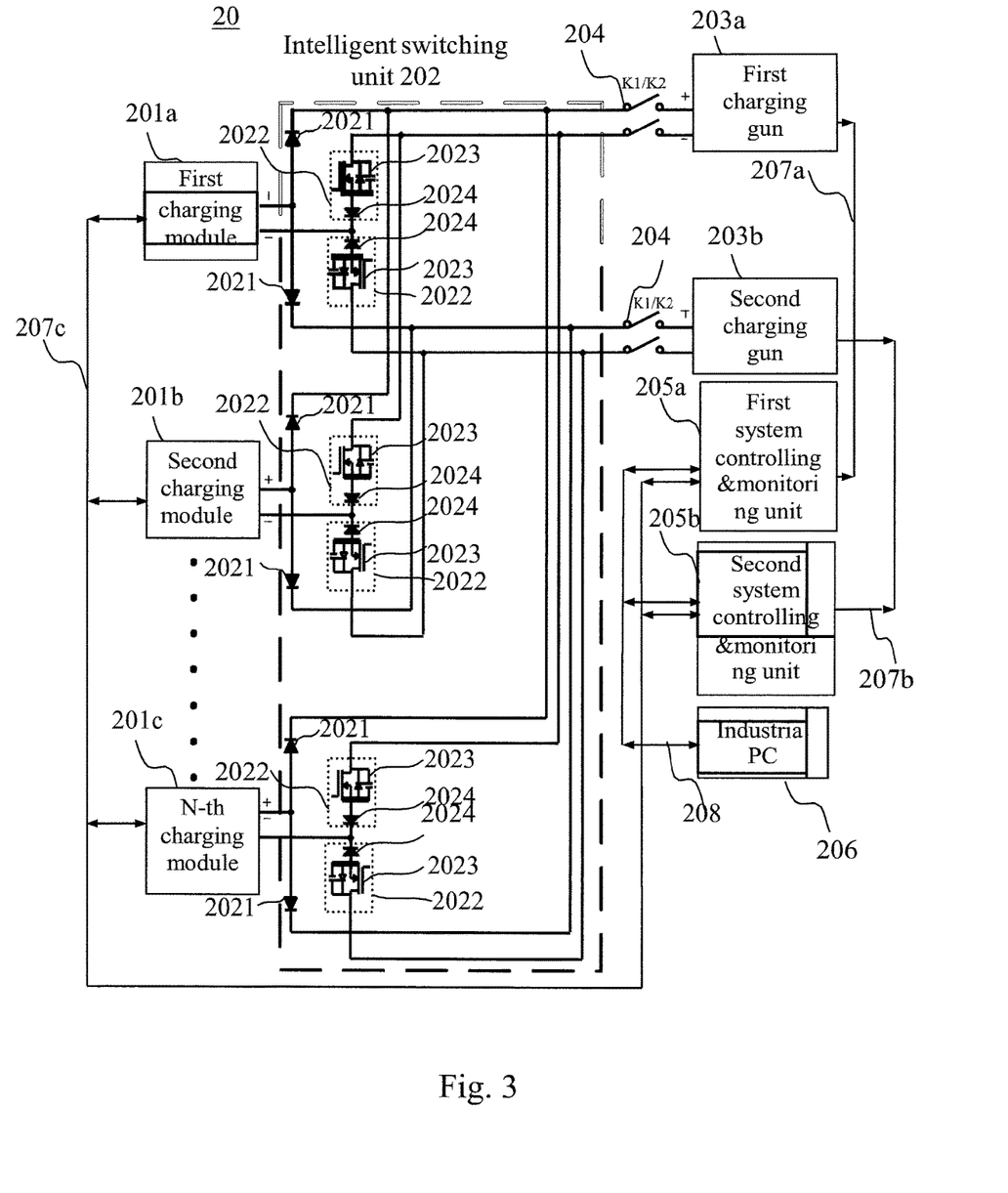
FIG. 3 illustrates an intelligent power distributing system for a charging station of the present invention in accordance with still another embodiment of the present invention.

With reference to FIG. 3, in still another embodiment of the present invention, the intelligent power distributing system for the charging station 20 of the present invention may include a plurality of charging modules, for instance a first charging module 201*a*, a second charging module 201*b*, . . . , a N-th charging module 201*c*. Furthermore, the intelligent power distributing system for the charging station 20 of the present invention may further include an intelligent switching unit 202 and a plurality of charging guns, for example a first charging gun 203*a* and a second charging gun 203*b*. The first charging gun 203*a* and the second charging gun 203*b* are employed to charge the electric car or the electric motorcycle. The intelligent switching unit 202 is utilized to dynamically distribute the charging power of the first charging module 201*a*, the second charging module 201*b*, . . . , the N-th charging module 201*c* to the first charging gun 203*a* and/or the second charging gun 203*b*. The first charging module 201*a*, the second charging module 201*b*, . . . , the N-th charging module 201*c* are coupled to the intelligent switching unit 202 respectively while the intelligent switching unit 202 is coupled to the plurality of charging guns, for instance the first charging gun 203*a* and the second charging gun 203*b* respectively. In one embodiment, at least two switches 204 are disposed between the first charging gun 203*a* and the intelligent switching unit 202 and between the second charging gun 203*b* and the intelligent switching unit 202 respectively. In a preferred embodiment, the intelligent switching unit 202 may include at least two MOSFETs (Metal-Oxide-Semiconductor Field-Effect Transistor), for instance but be not limited to at least two enhanced N type MOSFETs (such as 2N enhanced N type MOSFETs), at least two diodes, for example 2N diodes, and at least two capacitors, such as 2N capacitors. Each of the 2N enhanced N type MOSFETs, each of the 2N diodes and each of the 2N two capacitors are coupled to each other in parallel to form element 2023. The element 2023 may be coupled to a diode 2024 in series to form element 2022. In one embodiment, the intelligent switching unit 202 may further include at least two diodes 2021, for instance 2N diodes. These 2N diodes 2021 are independent of the 2N enhanced N type MOSFETs, the 2N diodes and the 2N capacitors. It should be noted that the aforementioned numbers are only described for illustrating the present invention, not for limiting the scope of the present invention. In one alternative embodiment, the element 2022 may be replaced with a relay. In one alternative embodiment, the MOSFET in the element 2023 may be replaced with an IGBT (Insulated Gate Bipolar Transistor). In one alternative embodiment, all of the diodes for example the diodes 2021 and 2024 or the diode in the element 2023 may be replaced with MOSFET or IGBT. In one alternative embodiment, the diodes 2021 may be replaced with the element 2022.

The first charging gun 203*a* is coupled to a first system controlling and monitoring unit 205*a* via a first automotive bus interface 207*a* while the second charging gun 203*b* is coupled to a second system controlling and monitoring unit 205*b* via a second automotive bus interface 207*b*. The first system controlling and monitoring unit 205*a* is employed to monitor the power output state of the first charging gun 203*a*, and the second system controlling and monitoring unit 205*b* is utilized to monitor the power output state of the second charging gun 203*b*. The first system controlling and monitoring unit 205*a* and the second system controlling and monitoring unit 205*b* are coupled to the first charging module 201*a*, the second charging module 201*b*, . . . and the N-th charging module 201*c* through a third automotive bus interface 207*c*. Meanwhile, the first system controlling and monitoring unit 205*a* and the second system controlling and monitoring unit 205*b* are coupled to an industrial PC (IPC) 206 via a network communication interface 208. The industrial PC 206 is employed to assist the first system controlling and monitoring unit 205*a* and the second system controlling and monitoring unit 205*b* in performing data computation. In one embodiment, the first system controlling and monitoring unit 205*a* and the second system controlling and monitoring unit 205*b* may include but be not limited to control and supervisor unit (CSU). The CSU can specifically realize various kinds of specifications for direct current charging of National Standard Institute regarding communication, monitoring, measurement, protection and human computer interaction counterparts, can communicate with the electric car or electric motorcycle, the power, the touch display and the cloud background in real time, can record the communication and error messages between the charging station and the electric car or electric motorcycle, and can be docked with the cloud background to provide messages to be analyzed. In one embodiment, the first automotive bus interface 207*a* and the second automotive bus interface 207*b* may include but be not limited to controller area network (CAN) bus interface. In one embodiment, the network communication interface 208 may include but be not limited to RS485 interface.

When the first system controlling and monitoring unit 205a detects that the first charging gun 203a is outputting power and the second system controlling and monitoring unit 205b detects that the second charging gun 203b is not outputting power, the first system controlling and monitoring unit 205a or the second system controlling and monitoring unit 205b will transmit instructions to the intelligent switching unit 202 to render the intelligent switching unit 202 to switch most of or all of the power of the first charging module 201a, the second charging module 201b, . . . , and the N-th charging module 201c to the first charging gun 203a according to the maximum energy or the maximum power which the electric car or the electric motorcycle can sustain. In other words, when only the first charging gun 203a is outputting power, the first system controlling and monitoring unit 205a or the second system controlling and monitoring unit 205b adjusts the intelligent switching unit 202 to provide the maximum energy or the maximum power to charge the electric car or the electric motorcycle according to the charging current demand of the electric car or the electric motorcycle. When the first system controlling and monitoring unit 205a detects that the first charging gun 203a is outputting power and the second system controlling and monitoring unit 205b detects that the second charging gun 203b is also outputting power, the first system controlling and monitoring unit 205a or the second system controlling and monitoring unit 205b will transmit instructions to the intelligent switching unit 202 to render the intelligent switching unit 202 to switch part of the power of the first charging module 201a, the second charging module 201b, . . . , and the N-th charging module 201c to the second charging gun 203b depending upon the power outputting state of the first charging gun 203a, i.e. render the intelligent switching unit 202 to switch the redundant output energy or the redundant output power of the first charging gun 203a to the second charging gun 203b.

Figure 4:
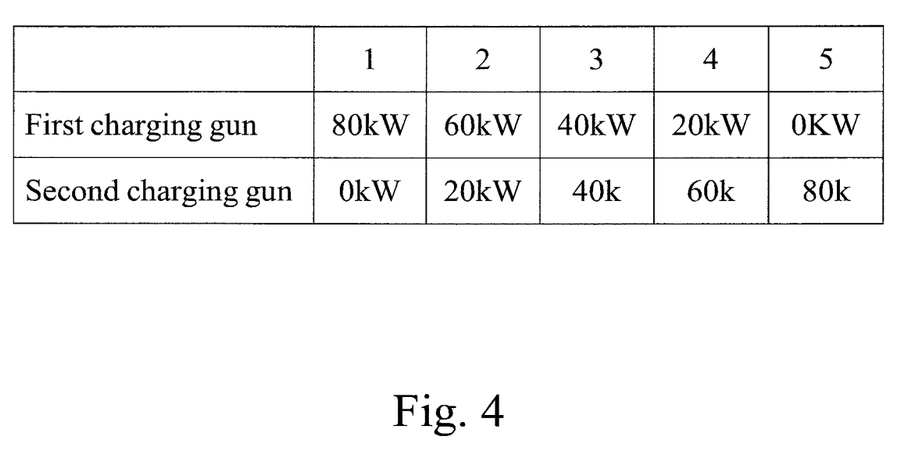
FIG. 4 illustrates a power distribution table of the dual gun charging station employing four charging modules in accordance with one embodiment of the present invention.

FIG. 4 illustrates the power distribution table of the dual gun charging station employing four charging modules (for example with 20 kW) in accordance with one embodiment of the present invention. For instance, when the first charging gun 203a needs 40 kW initially, the available power of the second charging gun 203b is 40 kW. When the electric car or the electric motorcycle connected with the first charging gun 203a is almost fully charged or the first charging gun 203a doesn't need so much power, the first system controlling and monitoring unit 205a or the second system controlling and monitoring unit 205b may switch the redundant power (20 kW as an unit) of the first charging gun 203a to the second charging gun 203b directly through the intelligent switching unit 202. Therefore, the present invention can distribute the charging energy or the charging power efficiently, optimize the distribution of the charging energy or the charging power and reduce the time required to charge the electric car or the electric motorcycle to the minimum.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the present invention. It is intended that all such modifications and alterations are included insofar as they come within the scope of the present invention as claimed or the equivalents thereof.

What is claimed is:

1. An intelligent power distributing system for charging station, comprising:

at least one charging module;
an intelligent switching unit coupled to said at least one charging module;
at least two charging guns coupled to said intelligent switching unit; and
at least two system controlling and monitoring units coupled to said at least two charging guns respectively, each of said at least two system controlling and monitoring units being coupled to said at least one charging module, one of said at least two system controlling and monitoring units transmitting instructions to said intelligent switching unit according to power outputting states of said at least two charging guns, such that said intelligent switching unit dynamically distributes charging power of said at least one charging module to one or more of said at least two charging guns, wherein said intelligent switching unit includes at least two first metal oxide semiconductor field effect transistors or insulated gate bipolar transistors, at least two second metal oxide semiconductor field effect transistors or insulated gate bipolar transistors and at least two capacitors, wherein a first end of a first one of said at least two first metal oxide semiconductor field effect transistors or insulated gate bipolar transistors is connected with a first end of a first one of said at least two second metal oxide semiconductor field effect transistors or insulated gate bipolar transistors and a first end of a first one of said at least two capacitors, wherein a second end of said first one of said at least two first metal oxide semiconductor field effect transistors or insulated gate bipolar transistors is directly connected with a second end of said first one of said at least two second metal oxide semiconductor field effect transistors or insulated gate bipolar transistors and a second end of said first one of said at least two capacitors.

2. The system of claim 1, wherein said at least two first metal oxide semiconductor field effect transistors or said at least two second metal oxide semiconductor field effect transistors include enhanced N type metal oxide semiconductor field effect transistors.

3. The system of claim 1, wherein each of said at least two first metal oxide semiconductor field effect transistors or insulated gate bipolar transistors, each of said at least two second metal oxide semiconductor field effect transistors or insulated gate bipolar transistors and each of said at least two capacitors are coupled to each other in parallel.

4. The system of claim 1, wherein said intelligent switching unit further includes at least two diodes and at least two second diodes.

5. The system of claim 4, wherein each of said at least two second diodes is coupled in series to an entire of each of said at least two first metal oxide semiconductor field effect transistors or insulated gate bipolar transistors, each of said at least two second metal oxide semiconductor field effect transistors or insulated gate bipolar transistors and each of said at least two capacitors.

6. The system of claim 4, wherein each of said at least two diodes and each of said at least two second diodes are replaced with metal oxide semiconductor field effect transistor or insulated gate bipolar transistor.

7. The system of claim 1, wherein said intelligent switching unit includes at least two relays.

8. The system of claim 1, further comprising an industrial PC coupled to each of said at least two system controlling and monitoring units to assist said at least two system controlling and monitoring units in performing data computation.

9. The system of claim 8, wherein said at least two system controlling and monitoring units are coupled to said industrial PC via network communication interfaces.

10. The system of claim 1, further comprising at least two switches disposed between said intelligent switching unit and said at least two charging guns respectively.

11. The system of claim 1, wherein said at least two system controlling and monitoring units are coupled to said at least two charging guns via automotive bus interfaces.

12. The system of claim 11, wherein said automotive bus interfaces include controller area network bus interfaces.

13. The system of claim 1, wherein said at least two system controlling and monitoring units are coupled to said at least one charging module through automotive bus interfaces.

14. The system of claim 13, wherein said automotive bus interfaces include controller area network bus interfaces.

\* \* \* \* \*